May 11, 1943.  C. L. HALL  2,318,853
FASTENER MEMBER
Filed March 20, 1941

Inventor:
Charles L. Hall.
by John Todd
Atty.

Patented May 11, 1943

2,318,853

UNITED STATES PATENT OFFICE 2,318,853

FASTENER MEMBER

Charles L. Hall, Detroit, Mich., assignor to United-Carr Fastener Corporation, Cambridge, Mass., a corporation of Massachusetts Application March 20, 1941, Serial No. 384,331

3 Claims. (Cl. 24—73)

This invention relates to improvements in detachable clip members of the type used to clamp pipes, wires and the like to a supporting frame and particularly to the fastening device by which the clip is secured to the frame.

The chief object of my invention is the provision of a clip member of simple and inexpensive manufacture adapted to be detachably assembled with a supporting panel from the front side thereof and providing relatively short attaching portions which engage behind the rear face of the support through an aperture in a way to take up a minimum amount of space on the last-mentioned side. Thus my improved fastening arrangement permits application of a clip member to supports which provide too little clearance on the rear side thereof to receive the relatively longer attaching portions common to fastener members of this type heretofore known in the art.

Other objects of my invention will be apparent from inspection of the drawing and specification hereinbelow set forth.

Referring to the drawing, in which I have illustrated a preferred embodiment of my invention:

Figure 1:
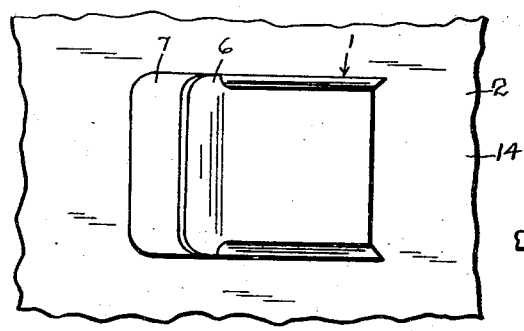
Fig. 1 is a top plan view of a clip member embodying my invention secured to a supporting panel.

Referring to the fastener device which I have chosen to illustrate my improved fastening, I have shown a clip member 1 which is adapted for securing a pipe line, such as commonly used in automobile manufacture for carrying air and gasoline, to a supporting panel 2. The panel 2 may be any suitable support such as part of the frame of an automobile. The panel 2 is provided with an elongated opening 3 having opposed longitudinal side walls 4 and transverse end walls 5.

Figure 2:
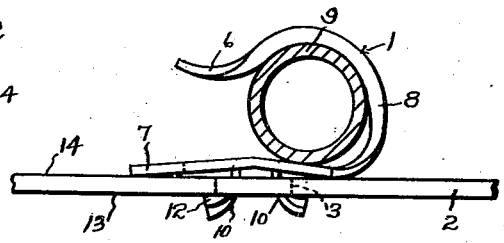
Fig. 2 is a side elevation of the installation shown in Fig. 1 and showing a conduit engaged by the clip member.

The clip member 1 is preferably formed from a single piece of spring metal and has a conduit-engaging portion of generally U shape providing a pair of fingers 6 and 7 connected by a portion 8. The fingers 6 and 7 are yieldable relative to each other and shaped to receive and engage a conduit 9 therebetween (Fig. 2).

The conduit-engaging portion is adapted to be secured in detachable engagement with the panel 2 entirely from one side of the panel and this is accomplished by a pair of attaching portions 10 which are struck from material of the finger 7, hereinafter referred to as the base, entirely within the marginal limits thereof so as to leave a pair of apertures 11 in the base. Each of the attaching portions 10 is in the form of a hook having a portion 12 adjacent its free end in spaced underlying relation to the base 7 and cooperating with the base to effect an engagement with opposed surfaces of the panel. The hook portions 10 are disposed in opposite relation and open in opposite directions. The end portions 12—12 form an elongated end having a length which is less than the major axis of the aperture 3, but greater than the minor axis permitting the attaching portions to be moved freely through the aperture 3 when registered therewith and then turned to engage the panel on a line parallel to the minor axis of the aperture in a manner to be described. In order to provide a firm take-up, the end portions 12 are inclined slightly at an angle relative to the general plane of the base 7 with the result that when the attaching portions are rotated, engagement of the inclined edges of the portions 12 with the rear surface 13 of the panel tends to draw the base tightly against the front surface 14 of the panel so as to effect a secure non-rattle attachment.

Figure 3:
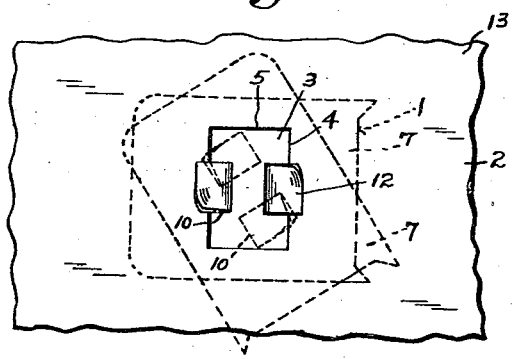
Fig. 3 is a rear view of the installation shown in Figs. 1 and 2 and illustrating by way of dotted lines the method by which the attaching portions of the clip member are turned into engagement with the supporting panel.
Figure 4:
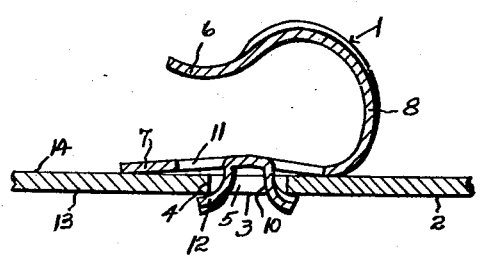
Fig. 4 is a section taken along the line 4—4 of Fig. 3.
Figure 5:
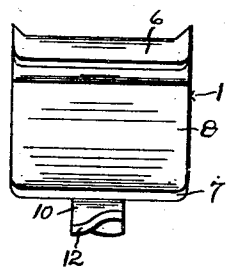
Fig. 5 is an end view of my improved clip member per se.
Figure 6:
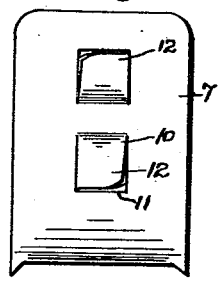
Fig. 6 is a bottom view of the clip member shown in Fig. 5.

Assembly of the parts of my installation is a relatively simple matter and is carried out through first moving the end portions 12—12 through the opening 3 in registering relation to the opening so as to engage the base 7 of the conduit-engaging portion with the front surface 14 of the panel. Then pressure is exerted on the conduit-engaging portion either by hand or by a suitable tool to rotate the fastener in an anti-clockwise direction (viewing Fig. 3) to receive the longer edges 4 of the aperture 3 between the end portions 12 of the hooks 10 and the base 7. The base 7, which may normally be bowed longitudinally, yields as a result of the wedging action effected by engagement of the inclined edges of the hooks with the edges 4 of the aperture. Force exerted on the base 7 tending to flatten the same is progressively increased during rotation of the hooks 10 until the hooks are disposed in final position in transverse relation to the aperture 3, as shown in Fig. 3, at which time the clip member is secured in firm engagement with the support. It will be understood that since the base 7 may flatten, the clip member is applicable to supports of varying thicknesses. Furthermore, there may be some flexibility in the hook portions per se, which increases the resilience of the fastener.

Thus, by my invention I have provided a clip member of extremely inexpensive construction yet capable of easy assembly with a supporting panel so as to be secured in firm engagement therewith. At the same time the attaching portions of the clip member project on the rear side of a panel a distance only slightly greater than the thickness of metal thereof. As a result, my fastener is particularly adapted for use in modern automobile construction wherein it is commonly desired to provide backing or insulation in close relation to the rear surface of the frame or support which carries the clip member.

Although I have illustrated and described a preferred embodiment of my invention, I do not wish to be limited thereby because the scope of my invention is best defined by the following claims.

I claim:

1. A rotary attachable and detachable fastener device formed from a single piece of spring sheet metal, said fastener having a base and a pair of substantially identical oppositely directed hook-shaped portions extending beyond one side of said base for engagement with a supporting panel through an elongated aperture thereof, said hook-shaped portions having end portions in spaced underlying relation to said base to engage an opposite side of said panel from said base, said hook-shaped portions forming an elongated end whose major length is slightly less than the length of the elongated panel aperture but greater than the width thereof so as to be movable axially freely through said aperture of said panel in one predetermined position only and thereafter rotatable to receive the material at the longer edges of said panel aperture between said base and said free ends thereby to secure said fastener device to said panel.

2. A rotary attachable and detachable device of the class described having a U-shaped clip for receiving and holding a tubing, wire and the like, said clip having one arm thereof providing a base adapted to be secured in engagement with one side of a supporting panel formed with an elongated aperture, said arm having a pair of substantially identical oppositely directed hook-shaped portions extending beyond one side thereof for engagement with a supporting panel through the aperture thereof, said hook-shaped portions having end portions in spaced underlying relation to said base to engage an opposite side of said panel from said base, said hook-shaped portions forming an elongated end whose major length is slightly less than the length of the panel aperture but greater than the width thereof so as to be movable axially freely through said elongated aperture of said panel in one predetermined position only and thereafter rotatable to receive the material at the longer edges of said panel aperture between said base and said free ends thereby to secure said fastener device to said panel.

3. A rotary attachable and detachable device of the class described having a U-shaped clip for receiving and holding a tubing, wire and the like, said clip having one arm thereof providing a base adapted to be secured in engagement with one side of a supporting panel formed with an elongated aperture, said arm having a pair of substantially identical oppositely directed hook-shaped portions extending beyond one side thereof for engagement with a supporting panel through an aperture thereof, said hook-shaped portions having end portions in spaced underlying relation to said base to engage an opposite side of said panel from said base, said hook-shaped portions forming an elongated end whose major length is slightly less than the length of the panel aperture but greater than the width thereof so as to be movable axially freely through said aperture of said panel in one predetermined position only and rotatable to receive the material at the longer edges of said panel aperture between said base and said free ends thereby to secure said fastener device to said panel, said attaching portions opening in opposite directions to receive opposed edges between said end portions and said base, portions of said hook-shaped portions adjacent the free ends thereof being inclined at an angle relative to the general plane of said base to draw said base firmly against said panel on rotation of said fastener.

CHARLES L. HALL.